Aug. 27, 1935.   C. E. BEAN ET AL   2,012,620
DEVICE FOR ELIMINATING OR PREVENTING THE
GLARE FROM MOTOR VEHICLE HEADLIGHTS
Filed Aug. 30, 1934
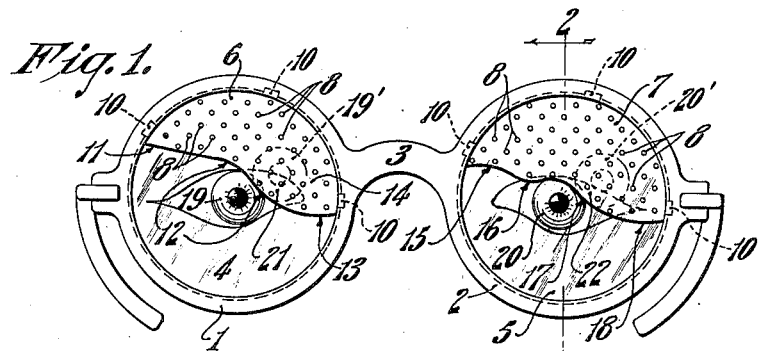
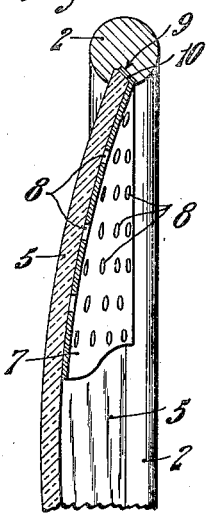
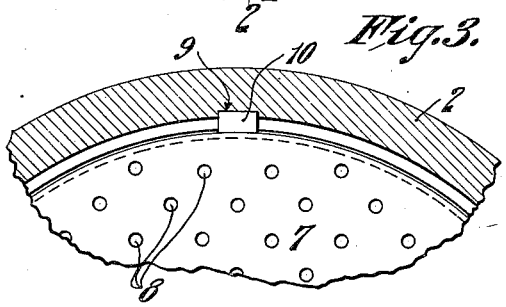
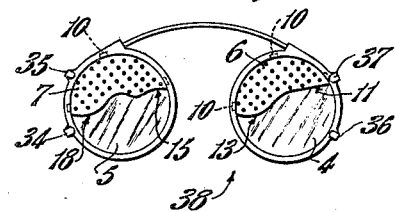
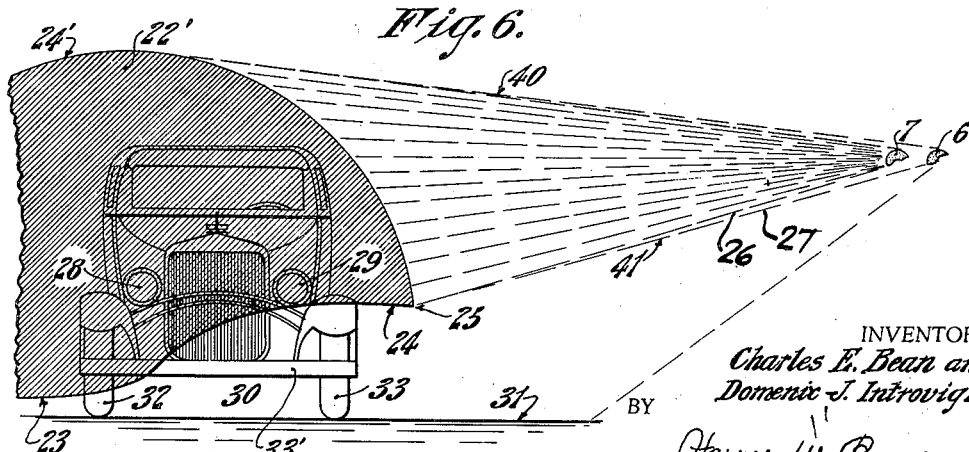
INVENTORS,
Charles E. Bean and
Domenic J. Introvigne,
BY Harry W. Bowen.
ATTORNEY.

Patented Aug. 27, 1935

2,012,620

UNITED STATES PATENT OFFICE 2,012,620

DEVICE FOR ELIMINATING OR PREVENTING THE GLARE FROM MOTOR VEHICLE HEADLIGHTS

Charles E. Bean, Stafford Springs, Conn., and Domenic J. Introvigne, Springfield, Mass.

Application August 30, 1934, Serial No. 742,114

3 Claims. (Cl. 88—41)

This invention relates to improvements in devices for eliminating or preventing the glare from motor vehicle head lights.

An object of the present invention is to effectually prevent the dazzling or blinding effect of the light rays, at night time, from the head lights of approaching motor vehicles.

It is well known that many accidents have occurred by reason of the fact that the vision of a driver, or drivers, of a motor vehicle, have been so blinded that collisions have occurred between motor vehicles on the road at night; also, pedestrians have been accidently struck, and often killed, due to the glare from such headlights. With these facts in mind, we have, after a long series of experiments, and practical tests, perfected a glare eliminator for aiding the operator of a motor vehicle in the night time, so as to enable him to be entirely free from the blinding, or dazzling effect of such headlights, and, also, will enable him to clearly see the front wheels of an approaching vehicle, as well as to clearly see the roadway, whereby he may avoid a collision, and, also, in addition, so direct the line of travel and position of his motor vehicle, relative to the side of the roadway, as to prevent him from going down a possible embankment, or, striking an obstruction, as a tree or pole beside the roadway, or a pedestrian, as will be fully described.

Broadly, our invention comprises two plates of suitable opaque material that are attached to the glasses, one on each lens. These plates are formed with a large number of small perforations of such a size, or diameter, that the effect of the light rays, as they pass through these perforations and each lens, will be so broken up that only a diffused effect will reach the eyes of the person operating the motor vehicle.

The size and shape of these opaque plates are different for each lens, in order that the angle of vision, with reference to the perforated plates and the front end of an approaching vehicle will enable the operator to clearly see the lower portions of the front wheels of an approaching vehicle and the roadway, but will, at the same time, cut off the glare or blinding rays from the headlights of such an approaching vehicle.

The perforated opaque plates are designed to be attached to the frames which support the two lenses of the spectacles and are preferably, though not necessarily, located on the inner surface of such lenses. These plates have their lower edges formed with a wavy, or irregular outline, of connected curves of such shape that, when these curves are combined, the resultant effect is to produce, on the front end of an approaching vehicle, a shaded, or diffused-shaped surface, whereby the operator can operate his vehicle, without colliding with the approaching vehicle, but may, by looking through the lower, uncovered, or clear portions, of the lens, clearly see the roadway ahead.

The final contours, or shapes, of the lower edges of these perforated light-diffusing plates, we have arrived at, after a long series of actual experiments with other shapes and forms, as well as to the number and size of the perforations.

The size of the perforations in the two opaque plates lies substantially between the limits of ten (10) and thirty (30) thousandths of an inch.

Referring to the drawing, which forms a part of the specification:—

Fig. 1 is a front, elevational view, looking towards the outside of the lens and showing the two different shaped opaque, perforated plates in place on the inside surface of the lens, also, the normal positions of the pupils of the eyes of the operator.

Fig. 2 is a transverse, sectional view on the plane of the line 2—2 of Fig. 1, showing one of the perforated plates in section, and the lens partially in section.

Fig. 3 illustrates the manner of securing the perforated plate in place.

Fig. 4 is a view, illustrating a pair of glasses having perforated plates attached thereto and designed for attaching and removing the same on an ordinary pair of glasses.

Fig. 5 is an illustration of a modified form of plate for insertion in a set of spectacles, without lenses, and Fig. 6 is a view, showing the combined effect of the two perforated plates, when the operator looks at the headlights of an approaching vehicle.

Referring to the drawing in detail:—

1 and 2 designate the bows of the glasses, having the connecting bridge piece 3, which normally rests on the nose rather than on the sides of the nose, for accurately positioning the glasses on all persons; and the lenses 4 and 5. 6 and 7 designate two plates, or pieces of opaque material, as thin aluminum, each having a large number of small perforations 8. These plates are formed at their upper edges on a curve which corresponds with the curvature of the bows 1 and 2. They are secured to the bows by means of small recesses 9, into which project the integral lips 10 on the plates, whereby, when the lenses are clamped in the frames, the plates are firmly secured at the same time.

The plates 6 and 7 are inserted in the frames 1 and 2, with the lenses; thus providing a positive lock by means of the projection 10 and the recess 9, which prevents removal of the plates 6 and 7 from the frames 1 and 2, and preventing any misplacement, or movement, of the plates 6 and 7, relative to the frames 1 and 2. This method of installation insures the permanent and correct positioning of the plates 6 and 7, relative to the frames 1 and 2, to each other, and to the pupils 19 and 20 of the eyes of a wearer.

Referring to the plate, indicated at 6, it will be observed that its lower edge is formed with the straight portion 11, the downwardly extending curved portions 12 and the remaining curved portion 13, thus producing the enlarged lower portion 14 of the plate 6. This plate is located on the right hand lens 4 of the wearer.

The other plate 7, over the left hand lens 5, it will be observed, is formed with four (4) curved, or wavy lines 15, 16, 17 and 18. The curves 13 and 18 are similar in conformation. The normal positions of the pupils of the two eyes 19 and 20, as shown, are adjacent the curved portions 12, 16 and 17, which provide the depending portions 21 and 22 of these plates. When the operator moves his head slightly downward in a vertical plane, the pupils will then be located back of these plates. The diffused light, through the small perforations 8, permits the operator of a motor vehicle to see the approaching machine, without being blinded.

When driving on the right hand side of the roadway and the operator moves his eyes towards the left, as shown in Fig. 6, the combined, or resultant effect, of the curved contour of the lower edges of the perforated plates, 6 and 7, is to see the shaded surface 22', indicated by the two curved lines 23 and 24 and the upper curved line 24'. The portion 24 is substantially a straight line with a sharp point 25, where the two lines of vision, 26 and 27, meet near this point and blend into the curve 23.

This shaded surface, which is the diffused light that the operator sees through the plates 6 and 7, provides a covering for the headlights 28 and 29, and at the same time, leaves an uncovered, or clear vision space 30, between the lines 23 and 24, and the roadbed surface 31. The position of the front wheels 32 and 33 and the bumper 33', being clearly seen, their position relative to the center line of the road can be determined. The operator can, therefore, accurately direct the movements of his car, and, at the same time, observe any object ahead of him, as a tree, pole, or a person walking in the roadway. At the same time, he will not collide with the approaching machine, or, turn too far to the right hand side of the roadbed, which may be a dangerous embankment.

It is obvious that any object, or light, appearing within the shaded area, bounded by the lines 40 and 41, will be shaded, or diffused, whereas, any object appearing below the line 41, including the road surface and the right hand shoulder of the road, will be clearly visible.

By employing perforated plates of different sizes and shapes and covering a portion only at the upper portions of the lenses 4 and 5, a large surface below these plates is obtained.

It is, of course, obvious, as stated, that these perforated plates may be used in frames, without lenses.

Fig. 5 illustrates a modified form of plate for use in a set of frames without lenses, (not shown).

The plate 7' is securely supported in the groove of the rim of the frame, by means of the extended, integral, curved rim portion 42, and is secured against rotation, or displacement, in the frame, by a lip 10. Whereas, we have shown, for purposes of illustration, a single plate, it will be understood that these plates are made and used in pairs, similar to those illustrated in Figs. 1 and 4. In this construction, an unobstructed line of vision is obtained through the opening 43.

Fig. 4 shows a pair of glasses, or frames 38, having the perforated plates 6 and 7 secured thereto. These glasses are provided with the hooks 34, 35, 36 and 37. They may be readily attached to an ordinary pair by simply placing the hooks over the rims; when not required, they may be readily removed.

We have found, from actual experiment, that the size of the perforations should be between the limits 10 and 30 thousandths of an inch and should be symmetrically arranged, as shown, for the best results.

The perforations 8 are preferably arranged in rows at 45° each way, relative to a plane passing through the vertical axis of the lenses, and are preferably spaced at between five and seven diameters of the perforations apart, each way.

It will be observed, from Fig. 1, that the diffused effect is produced, when the two pupils 19 and 20 assume the dotted line positions 19' and 20'.

It is also to be understood that we do not limit ourselves to lenses that are round, as other shapes may be used, as hexagonal.

Referring to Fig. 6, it should be stated that the glare from the head lights of approaching motor vehicles following, or, in the rear of the vehicle nearest the operator, will also be eliminated. This is shown by the shaded surface 22' and the line of vision, indicated by the space between the lines 40 and 41. In this way, the operator of a motor vehicle is protected, not only from the glare of the head lights from one approaching motor vehicle, but from a long line of cars in succession, which is an important feature.

What we claim is:—

1. A pair of spectacles for eliminating glare comprising a pair of lenses, means for mounting the lenses, a plate of opaque material associated with each lens and covering an upper portion thereof, said plates being of unequal size with different inclined wavy formations at their lower edges, and having perforations therein between ten (10) and thirty (30) thousandths of an inch in diameter, said perforations being spaced from one another between five and seven times the diameter of each perforation, whereby the user when moving the spectacles to operative position will have one eye more shielded from approaching glare than the other eye, and the combined wavy formations producing an inclined shaped curve which permits clear vision on the roadway and a front portion of the vehicle, but shields the glare of the headlights.

2. A pair of spectacles for eliminating glare comprising a pair of lenses, means for mounting the lenses, a plate of opaque material associated with each lens and covering an upper portion thereof, said plates being of unequal size and having the edges thereof adjacent the horizontal axes of the lenses of wavy configuration said wavy edge of each plate slanting downwardly toward a side of the lens nearest approaching glare and ending on said side in a substantially horizontally curved portion, said plates having perforations therein between ten (10) and thirty (30) thousandths of an inch in diameter, said perforations being spaced from one another between five and seven times the diameter of each perforation, whereby the user when moving the spectacles to operative position will have one eye more shielded from approaching glare than the other eye.

3. The combination, in a pair of spectacles, for eliminating glare, of a perforated plate of opaque material on each lens, the plates being of unequal size and each being located on the major portion of the upper surface of each lens, the plate over the right hand lens having less covering surface than the plate over the left hand lens, the contour of the lower edge of each plate having continuous, distinctively different curved, wavelike lines, said lines being above the center of the lens and the perforations in each plate being between ten and thirty thousandths of an inch, the construction of said plates enabling the user to shield his eyes from the glare of an approaching motor vehicle and at the same time clearly distinguish the roadway and lower part of the approaching motor vehicle.

CHARLES E. BEAN.
DOMENIC J. INTROVIGNE.